US012654670B2

(12) United States Patent
Baig et al.

(10) Patent No.: US 12,654,670 B2
(45) Date of Patent: Jun. 16, 2026

(54) AIRCRAFT HYBRID ELECTRIC PROPULSION ARCHITECTURE ENABLING MODES OF OPERATION

(71) Applicant: RTX Corporation, Farmington, CT (US)

(72) Inventors: Zubair A. Baig, South Windsor, CT (US); Martin Amari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 249 days.

(21) Appl. No.: 18/179,045

(22) Filed: Mar. 6, 2023

(65) Prior Publication Data

US 2024/0300657 A1      Sep. 12, 2024

(51) Int. Cl.
| | |
|---|---|
| *B64D 27/33* | (2024.01) |
| *B60L 1/08* | (2006.01) |
| *B60W 10/08* | (2006.01) |
| B64D 27/02 | (2006.01) |
| B64D 27/24 | (2006.01) |
| B64D 31/18 | (2024.01) |
| F01D 15/10 | (2006.01) |

(Continued)

(52) U.S. Cl.
CPC .............. B60W 10/08 (2013.01); B60L 1/08 (2013.01); *B64D 27/026* (2024.01); *B64D 27/24* (2013.01); *B64D 27/33* (2024.01); *B64D 31/18* (2024.01); *B64D 2221/00* (2013.01); *F01D 15/10* (2013.01); *F05D 2220/323* (2013.01); *F05D 2270/05* (2013.01); *H02J*

*2105/32* (2026.01); *H02J 2105/51* (2026.01); *H02J 2105/52* (2026.01); *H02P 2101/30* (2015.01)

(58) Field of Classification Search
None
See application file for complete search history.

(56) References Cited

U.S. PATENT DOCUMENTS

| | | |
|---|---|---|
| 9,156,560 B2 | 10/2015 | Burns et al. |
| 10,583,931 B2 | 3/2020 | Cline et al. |

(Continued)

FOREIGN PATENT DOCUMENTS

| | | |
|---|---|---|
| CN | 112537453 B | 4/2022 |

OTHER PUBLICATIONS

Search Report issued in European Patent Application No. 24161865. 1; Application Filing Date Mar. 6, 2024; Date of Mailing Aug. 12, 2024 (10 pages).

(Continued)

*Primary Examiner* — Phutthiwat Wongwian
*Assistant Examiner* — Jacek Lisowski
(74) *Attorney, Agent, or Firm* — CANTOR COLBURN LLP

(57) ABSTRACT

An aircraft hybrid electrical propulsion (HEP) system includes an electrical system configured to deliver power to a plurality of electrical loads, a propulsion system configured to generate thrust in response to an input power, and an HEP controller in signal communication with the electrical system and the propulsion system. The HEP controller is configured to monitor a load demand of at least one electrical load among the plurality of electrical loads and to actively control the input power to actively control the thrust in response to changes in the load demand.

20 Claims, 4 Drawing Sheets

(51) Int. Cl.

| | |
|---|---|
| *H02J 105/30* | (2026.01) |
| *H02J 105/50* | (2026.01) |
| *H02J 105/52* | (2026.01) |
| *H02P 101/30* | (2015.01) |

(56) References Cited

U.S. PATENT DOCUMENTS

| | | | | |
|---|---|---|---|---|
| 11,143,113 | B2 * | 10/2021 | Kopeschka | ............... F02C 9/48 |
| 2012/0318914 | A1 | 12/2012 | Rajashekara et al. | |
| 2015/0159552 | A1 * | 6/2015 | Rodriguez | ............... F02C 7/32 |
| | | | | 290/2 |
| 2017/0327224 | A1 * | 11/2017 | Phan | ........................ G08G 5/54 |
| 2020/0063599 | A1 | 2/2020 | Waun | |
| 2022/0063819 | A1 * | 3/2022 | Murrow | ................. B64D 31/18 |
| 2022/0242585 | A1 | 8/2022 | Hon et al. | |
| 2022/0292987 | A1 | 9/2022 | Bacic et al. | |
| 2022/0363402 | A1 * | 11/2022 | Schenk | ................. B64D 31/18 |

OTHER PUBLICATIONS

Office Action issued in European Patent Application No. 24161865. 1; Application Filing Date Mar. 6, 2024; Date of Mailing Jul. 29, 2025 (7 pages).

* cited by examiner

AIRCRAFT HYBRID ELECTRIC PROPULSION ARCHITECTURE ENABLING MODES OF OPERATION

BACKGROUND

Exemplary embodiments of the present disclosure pertain to the art of aircraft propulsion systems, and more particularly to an aircraft hybrid electric propulsion (HEP) system.

Recent advances in electrical motors, energy storage systems, and power electronics converters (PEC) are leading aircraft propulsion to become increasingly electrical. Hybrid-electric propulsion (HEP) systems have been developed which implements electrical systems in place of one or more traditional aircraft mechanical systems. Fuel and battery sources, for example, may be implemented to allow more possibilities for managing the propulsion system in various stages of a mission, and to reduce fuel consumption, compared with traditional propulsion systems. The increase in electrical systems increases the overall load of the aircraft, and produces greater complexity in the operation. As such, proper management of the electrical components and combustion desirable to meet the environmental requirements and reduce the fuel consumption of the aircraft is necessary.

BRIEF DESCRIPTION

According to a non-limiting embodiment, a hybrid electrical propulsion (HEP) system included in an aircraft is provided. The HEP system comprises a propulsion system, an electrical system, and a HEP controller. The propulsion system includes a propulsor and an electric motor configured to drive the propulsor and is configured to generate at least one of thrust or lift for operation of the aircraft. The electrical system is configured to deliver a first amount of power to the electric motor and a second amount of power to a plurality of electrical loads. The HEP controller is in signal communication with the electrical system and the propulsion system. The HEP controller is configured to monitor a load demand of at least one electrical load of the plurality of electrical loads and to actively modify at least one of the first amount of power or the second amount of power in response to changes in the load demand.

In addition to one or more of the above disclosed aspects of the system or as an alternate, actively controlling the input power includes reducing the first amount of power and increasing the second amount of power.

In addition to one or more of the above disclosed aspects of the system or as an alternate, the HEP controller is further configured to determine a predicted load demand of the at least electrical load, wherein the first amount of power is reduced based on the predicted load demand.

In addition to one or more of the above disclosed aspects of the system or as an alternate, the HEP controller is further configured to identify the at least one electrical load based at least in part on a mission requirement, and to determine that the load demand of the at least one electrical load exceeds the second amount of power. According to a non-limiting embodiment, actively modifying the at least one of the first amount of power or the second amount of power includes reducing the first amount of power and increasing the second amount of power based on a determination that the electrical load exceeds the second amount of power.

In addition to one or more of the above disclosed aspects of the system or as an alternate, the electrical system comprises a sensor in signal communication with the at least one electrical load and the HEP controller. The sensor is configured to output a load signal indicative of an amount of power drawn by the at least one electrical load. According to a non-limiting embodiment, the HEP controller actively modifies the at least one of the first amount of power and the second amount of power based on the amount of power drawn by the at least one electrical load.

In addition to one or more of the above disclosed aspects of the system or as an alternate, the HEP controller further predicts the load demand and actively modifies the at least one of the first amount of power and the second amount of power based on the amount of power and a predicted load demand.

In addition to one or more of the above disclosed aspects of the system or as an alternate, actively modifying one or both of the first amount of power and the second amount of power includes actively distributing a total amount of power available among the plurality of electrical loads according to a smart prioritization scheme configured to actively distribute the total amount of available power to the at least one electrical load based on one or more actively changing scheme conditions.

In addition to one or more of the above disclosed aspects of the system or as an alternate, the HEP controller is further configured to identify an increase in load demand of the propulsion system and increases the first amount of power in response to the increase in the load demand of the propulsion system.

In addition to one or more of the above disclosed aspects of the system or as an alternate, the HEP controller actively modifies one or both of the first amount of power and the second amount of power based on a power prioritization algorithm that assigns goal weighting strategies to the HEP system and the at least one electrical load.

In addition to one or more of the above disclosed aspects of the system or as an alternate, the HEP controller maps power goals to different flight events performed by the HEP system and the at least one electrical load, and controls the electrical system to transfer power between the propulsion system and the at least one electrical load to balance power loading in the electrical system while the propulsion system or the at least one load performs the flight event.

According to another non-limiting embodiment, a method is provided to actively perform motor and electrical load management in a hybrid electrical propulsion (HEP) system of an aircraft. The method includes generating electrical power from an electrical system, delivering a first amount of the power to a propulsion system including a propulsor and an electric motor configured to drive the propulsor, and generating at least one of thrust or lift to operate the aircraft based on the first amount of power. The method further includes delivering a second amount of the power to a plurality of electrical loads, and monitoring, by a HEP controller in signal communication with the electrical system and the propulsion system, a load demand of at least one electrical load of the plurality of electrical loads. The method further includes actively modifying one or both of the first amount of power and the second amount of power in response to changes in the load demand.

In addition to one or more of the above disclosed aspects of the system or as an alternate, actively controlling the input power includes reducing the first amount of power and increasing the second amount of power.

In addition to one or more of the above disclosed aspects of the system or as an alternate, the method further includes determining, by the HEP controller, a predicted load demand of the at least electrical load; and reducing the first amount of power based on the predicted load demand.

In addition to one or more of the above disclosed aspects of the system or as an alternate, the method further includes identifying, by the HEP controller, the at least one electrical load based at least in part on a mission requirement, determining, by the HEP controller, that a load demand of the at least one electrical load exceeds the second amount of power, and reducing the first amount of power and increasing the second amount of power based on a determination that the electrical load exceeds the second amount of power.

In addition to one or more of the above disclosed aspects of the system or as an alternate, the method further includes outputting, from a sensor in signal communication with the at least one electrical load and the HEP controller, a load signal indicative of the load demand of the at least one electrical load; and actively modifying, by the HEP controller, one or both of the first amount of power and the second amount of power based on the load demand of the at least one electrical load.

In addition to one or more of the above disclosed aspects of the system or as an alternate, the method further includes predicting, by the HEP controller, the load demand; and actively modifying, by the HEP controller, one or both of the first amount of power and the second amount of power based on the amount of power and a predicted load demand.

In addition to one or more of the above disclosed aspects of the system or as an alternate, actively modifying one or both of the first amount of power and the second amount of power includes actively distributing a total amount of power available among the plurality of electrical loads according to a smart prioritization scheme configured; and actively distributing the total amount of available power to the at least one electrical load based on one or more actively changing scheme conditions.

In addition to one or more of the above disclosed aspects of the system or as an alternate, method further includes identifying, by the HEP controller, an increase in a load demand of the propulsion system; and increasing the first amount of power in response to the increase in the load demand of the propulsion system.

In addition to one or more of the above disclosed aspects of the system or as an alternate, the method further comprises executing, the by HEP controller, a power prioritization algorithm that assigns goal weighting strategies to the HEP system and the at least one electrical load; actively modifying, by the HEP controller, one or both of the first amount of power and the second amount of power based on power prioritization algorithm.

In addition to one or more of the above disclosed aspects of the system or as an alternate, the method further includes mapping, by the HEP controller, power goals to different flight events performed by the HEP system and the at least one electrical load; and controlling the electrical system to transfer power between the propulsion system and the at least one electrical load to balance power loading in the electrical system while one or both of the propulsion system and the at least one load performs a flight event included in the different flight events.

The above described and other features are exemplified by the following figures and detailed description. Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Legacy engines operate to produce thrust and generate electrical power using mechanical propulsion systems. As a result, these legacy systems are not involved with load management and energy management associated with different electrical systems on the aircraft. The increased implementation of electrical systems and monitoring capabilities allows for precisely controlling operation of one or more electrical systems to improve the operating efficiency of the aircraft.

One or more non-limiting embodiments described herein provides an aircraft hybrid electric propulsion (HEP) system capable of performing load management and energy management associated with different electrical systems on the aircraft. The aircraft HEP system can operate as an integrated motor/load management system which enables different power exchange modes to actively control thrust of the hybrid propulsor in response to changes in electrical loads applied to the electrical systems. When a high load is applied to the electrical system, or a high-load is predicted to appear on the electrical system, power to the motor(s) of the propulsor can be reduced thereby decreasing thrust, while providing an additional amount of power to satisfy the increased load demand of one or more electrical loads. Accordingly, the additional amount of power can be transferred to the electrical system(s) associated with the high load or increased load demand. Once the load demand is removed, power driving the electrical load can be reduced, or in some instances completed remove, and transferred back to the propulsion system.

In one example, the aircraft HEP system performs load management by reducing power to the motors and transferring the available power to an electrical system realizing or demanding an increased electrical AC load and vice versa. For example, during aircraft descent, reduced AC power can be delivered to the motors to reduce thrust and/or lift from the propulsors and glide the aircraft, while increased power is delivered to an electrical system realizing an increased AC load. When the high-load is removed, power from the electrical system associated with the load can be returned to the motors, allowing the propulsors to provide maximum thrust and/or lift if called upon. In this manner, total power use remains constant throughout the different power exchange modes. In this manner, the aircraft hybrid electric propulsion (HEP) system is capable of providing continuous energy/power balancing throughout the duration of the aircraft flight.

Figure 1:
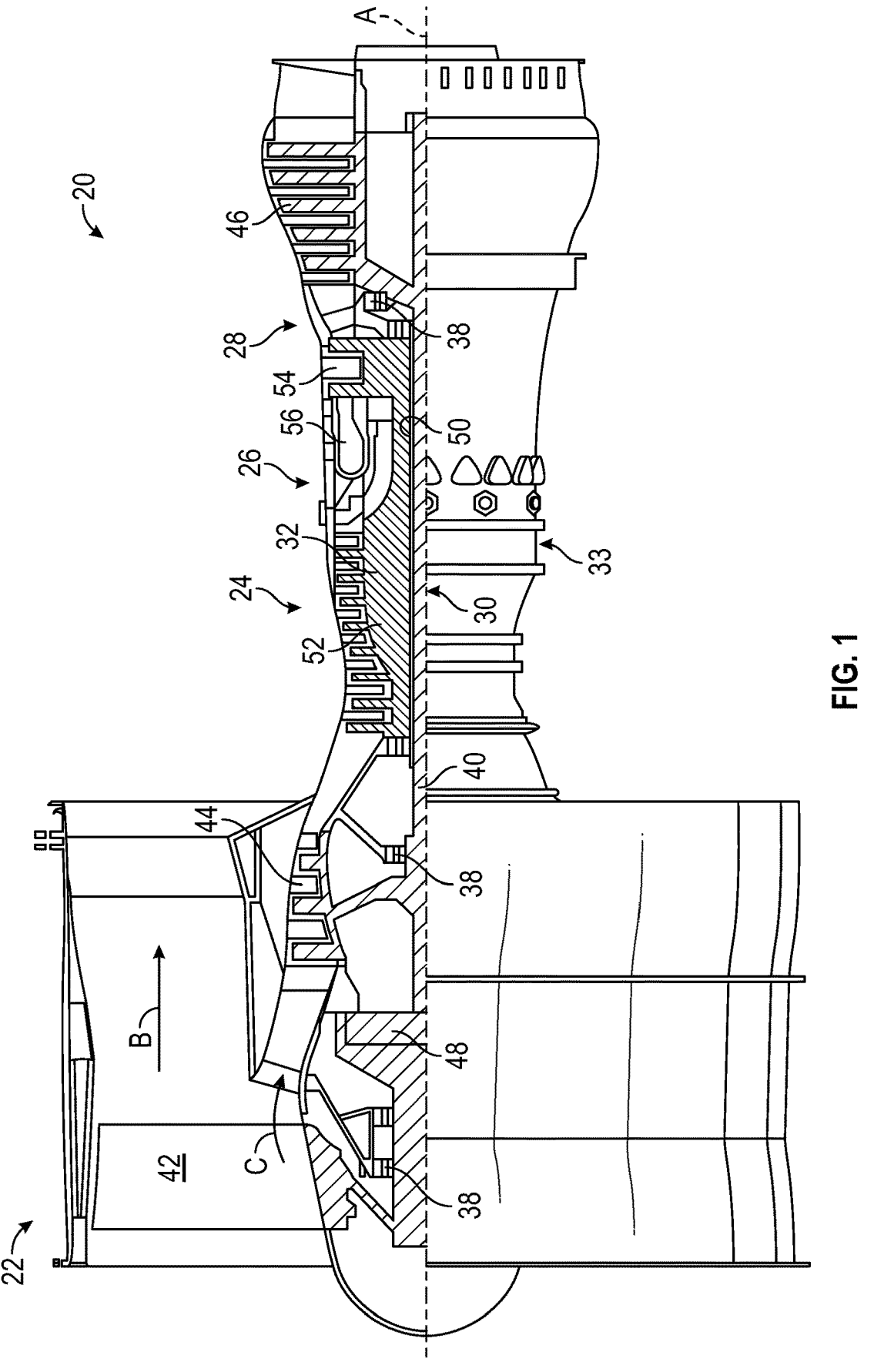
FIG. 1 is a block diagram depicting gas turbine engine capable of operating with an aircraft hybrid electric propulsion (HEP) system according to a non-limiting embodiment of the present disclosure.

With reference now to FIG. 1, a gas turbine engine 20 is schematically illustrated according to a non-limiting embodiment of the present disclosure. The gas turbine engine 20 is disclosed herein as a two-spool turbofan that generally incorporates a fan section 22, a compressor section 24, a combustor section 26 and a turbine section 28. In one or more non-limiting embodiments, the gas turbine engine 20 is implemented as a turbo-generator or motor-generator such that the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]{circumflex over ( )}0.5. The "Low corrected fan tip speed" as disclosed herein according to one non-limiting embodiment is less than about 1150 ft/second (350.5 m/sec).

Figure 2:
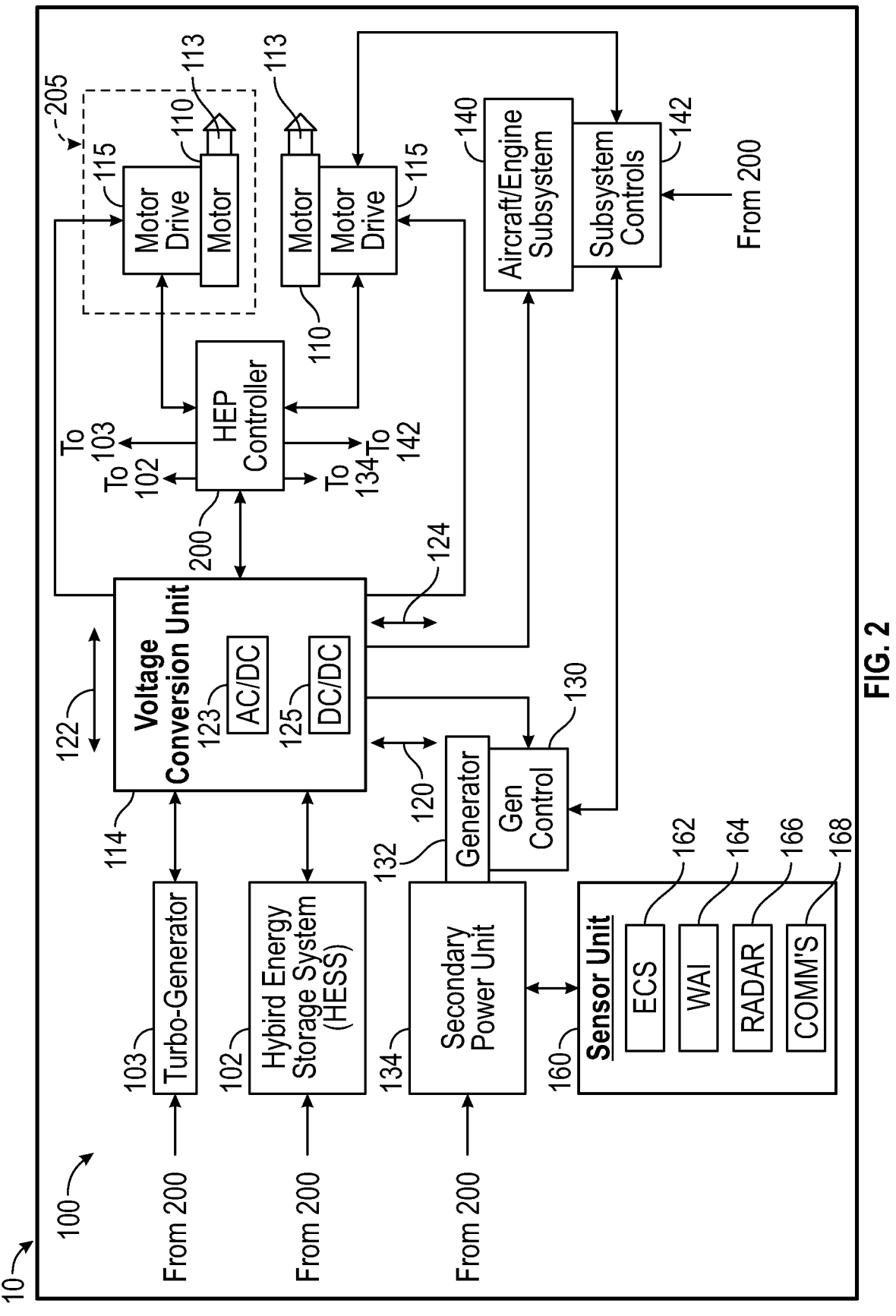
FIG. 2 is a block diagram illustrating a control system configured to enable various operating modes of an aircraft HEP system according to a non-limiting embodiment of the present disclosure.

Turning now to FIG. 2, a HEP system 100 of an aircraft 10 is illustrated according to a non-limiting embodiment of the present disclosure. The aircraft 10 can include a pilot-operated aircraft or an autonomous aircraft (e.g., an unmanned aerial vehicle (UAV). The HEP system 100 can include a hybrid energy storage system (HESS) 102, a propulsion system 205, and a HEP controller 200. The HEP system 100 can provide electric power flows 120, 122, 124 (collectively referred as 120-124), which can be bidirectionally controlled to shift energy between elements of the HEP system 100 in order to actively balance power loading between the propulsion system 205 and AC electrical systems throughout the duration of the flight. According to one or more non-limiting embodiments, selection and timing for engaging the various electric power flows 120-124 can be controlled by the HEP controller 200.

The HESS 102 includes one or more energy storage subsystems. The energy storage subsystems can include at least two energy subsystems, for example, having a different power-energy density, power draw characteristics and/or dissimilar configuration/architecture to meet various types of power demands and fault protection with backup power sources.

In one non-limiting example, the at least two energy storage subsystems can include a super/ultra-capacitor and a battery system. According to a non-limiting embodiment, the hybrid energy storage system 102 can be sized to store energy to support transient bursts of the gas turbine engine 20 for a power assist during a snap acceleration or power shedding during a snap deceleration. Using the battery system, for example, for a wide range of acceleration and deceleration conditions can result in oversizing battery capacity with corresponding additional weight carried to meet potential transient demands. The super/ultra-capacitor, for example, can provide a lower storage capacity than the battery system but has a higher charge/discharge rate as compared to the battery system.

The super/ultra-capacitor can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor can have higher energy efficiency due to a lower internal resistance than the battery system. The super/ultra-capacitor can be operatively coupled to the battery system through a direct current (DC)-to-DC converter, for example. The DC-to-DC converter can convert a voltage level of the battery system to match a voltage level of the super/ultra-capacitor to support charging of the super/ultra-capacitor by the battery system. In alternate embodiments, the DC-to-DC converter can be omitted where regulation between the super/ultra-capacitor and the battery system is not needed.

According to a non-limiting embodiment, the HESS 102 can also implement a third energy storage system, which includes an isolated battery pack accessible by the HEP controller based on determining a mode of operation of the aircraft 10. For example, the aircraft mode of operations can include, but are not limited to, a ground-based power mode of operation, a flight power mode, or an emergency power mode of operation. The emergency power mode can use an isolated battery pack to provide power through a DC-to-DC converter to other elements of the HEP system 100, for instance, in place of another power source such as, for example, a ram-air turbine.

According to a non-limiting embodiment, one or more electric motors 110 are operably coupled to drive a respective fan 113. The combination of the motor 110 and fan 113 can be utilized at least partially with the gas turbine engine 20 to implement a hybrid propulsion system 205, also referred herein as "a hybrid propulsor." Each motor 110 is driven by a motor drive unit 115. Accordingly, increasing or decreasing the power delivered to the motor 110 increases or decreases, respectively, the thrust and/or lift produced by the fan 113.

In the example of FIG. 2, the HESS 102 is operably coupled to a voltage conversion unit 114 which is operably coupled to the motor drives 115. The motor 110 and/or the motor drives 115 can include one or more motor sensors configured to output motor data indicative of operation of the motor(s) 115. The motor data can include, but is not limited to, motor speed, motor temperature, power consumption, and/or load demand (e.g., power demand).

According to a non-limiting embodiment, the HESS 102 can manage the storage of the energy, and facilitate voltage conversion by changing the potential of the energy (e.g., steps up voltage or steps down voltage) to accommodate system energy needs. The HEP controller 102 communicates with voltage conversion unit 114, and provides it with instructions pertaining to voltage conversions as needed per mission objectives of the aircraft 10.

The voltage converter unit 114 can include an AC-to-DC converter 123 and/or a DC-to-DC converter 125, and interfaces with a turbo-generator 103 (e.g., gas turbine engine 20 with a motor-generator), a HEP controller 200, and a generator controller 130 associated with a generator 132 of a secondary power unit 134. In one or more non-limiting embodiments, the voltage converter unit 114 converts AC power received from the turbo-generator 103 into DC power, and distributes the converted DC power to various electrical systems including, but not limited to, the generator controller 130, the aircraft/engine subsystems 140, and the motor drives 115. In various examples, the aircraft/engine subsystems 140 can include mission systems associated with the aircraft and/or aircraft operation, such as, for example, weather monitoring systems, air traffic monitoring systems, radar systems, communication systems, and/or the like.

The secondary power unit 134 can be a heat engine or any type of power generating device operable to drive rotation of the generator 132. According to one or more non-limiting embodiments, the secondary power unit 134 provides power to a sensor suite 160. The sensor suite 160 can include, but is not limited to, one or more environmental control system (ECS) sensors 162, one or more wing anti-ice (WAI) sensors 164, one or more radar sensors 166, and one or more communication (COMM) sensors 168, or other sensors such as lidar sensors, radar sensors, and/or the like, for example.

One or more aircraft electrical subsystems 140 are operably coupled to the voltage conversion unit 114 and aircraft/engine subsystem controls 142. The aircraft electrical subsystems 140 can include, but are not limited to, an engine subsystem, an aircraft low-voltage DC subsystem, an aircraft high-voltage DC subsystem, an aircraft AC subsystem, an aircraft de-icing system, environmental control systems (ECS), and/or other aircraft mission systems (e.g., weather monitoring, communication, air traffic monitoring, etc.). One or more of the subsystems included in the aircraft electrical subsystems 140 can also include one or more sensors configured to output monitored or sensed data associated with a respective subsystem.

The voltage conversion unit 114 can perform various voltage conversions needed to operate the devices and/or systems of the HEP system 100. Although only one voltage conversion unit 114 is depicted, it should be understood that multiple voltage conversion units can be incorporated in the HEP system 100 and that reference to the voltage conversion unit 114 can include one or more voltage conversion units within the HEP system 100.

One or more of the voltage conversion unit 114, the motor drive 115, the generator controls 130, and or aircraft/engine subsystem controls 142 can include inverter/power drive circuitry that applies known power control techniques to control the power, current, speed and/or torque produced by one or more of the electric motor 110, AC/DC converter 123, DC/DC converter 125, generator 132, and aircraft/engine subsystems 140, respectively. For example, during a snap acceleration, electric power from the hybrid energy storage system 102 is provided through the voltage conversion unit 114 and the motor drive 115 (e.g., power conditioning electronics) to drive the electric motor 110 in a motor mode to drive the fan 113, such as to produce thrust/lift. During a snap deceleration, the generator 111 can be used to increase the engine load on the engine shaft, with resulting current passed through the voltage conversion unit 114 for storage in the hybrid energy storage system 102 or used elsewhere within the HEP system 100. Accordingly, the electric motors 110 and associated fans 113 can provide the majority of the lift/thrust for the aircraft 10. In this manner, the active control/routing of the electrical power from the motors 110 can be recovered and transferred to electrical systems supporting the initiated mission system(s) and, if necessary, can achieve a slight descent or deceleration can maintain altitude while reducing aircraft speed.

The HEP system 100 further includes a HEP controller 200, which is in signal communication with the propulsion system 205, the HESS 102, the turbo-generator 103, the secondary power unit 134, and the aircraft/engine subsystem controls 142 such as, for example, one or more mission system controls). The mission system controls can include, but are not limited to, lighting, heating, cooling, and various forms of data communication.

In an embodiment, the HEP controller 200 includes a memory system to store instructions that are executed by a processing system. The executable instructions may be stored or organized in any manner and at any level of abstraction, such as in connection with a controlling and/or monitoring operation of the HEP system 100 and/or the propulsion system 205. The processing system can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 192 may include random access memory (RAM), read only memory (ROM), or other electronic, optical, magnetic, or any other computer readable medium onto which is stored data and control algorithms in a non-transitory form. Other controllers of FIG. 2 can include similar elements.

The HEP controller 200 can actively manage power transfer from or to the propulsion system 205, the HESS 102, the aircraft/engine subsystems 140 (via the subsystems control 142) and one or more sensor systems 162-168 included in the sensor suite 160 (via the secondary power unit 134). The HEP controller 200 can monitor a state of charge of the hybrid energy storage system 102, along with various power requests from one or more of the aircraft systems such as, for example, the aircraft/engine subsystems control 140, the secondary power unit 134, the motor controller 115, the generator controller 130, the generator 132, and/or the sensor suite 160. The HEP controller 200 can also interface with and control multiple elements of the HEP system 100 and the propulsion system 205, such as switches, current sensors, voltage sensors, temperature sensors, communication buses, and the like.

According to a non-limiting embodiment, the HEP controller 200 is configured to monitor a load demand of the at least one electrical load associated with the sensor suite 106 and/or the aircraft/engine subsystems 140, and actively control input power delivered to the propulsion system 205 (e.g., the motor(s) 110) to actively control the thrust in response to changes in the load demand. In this manner, the HEP controller 200 can actively decrease or increase the input power to the propulsion system 205 in response to an increase in at least one of the amount of power drawn by one or more sensor systems included in the sensor suite 160 and/or one more aircraft/engine subsystems 140.

According to another example, the HEP controller 200 can determine that a power demand of a mission system exceeds a power available for a plurality of electrical loads on the aircraft. The HEP controller 200 may thus decrease the input power to the propulsion system 205 to provide additional power available to the mission system. In some examples, the HEP controller 200 may determine the power demand based on a duration of operation of the mission system, and may reduce the power to the propulsion system 205 to satisfy the power demand for the duration of operation.

In addition, or alternatively, the HEP controller is further configured to identify the at least one electrical load based at least in part on a mission requirement; and determine that the load demand of the at least one electrical load exceeds the second amount of power. The HEP controller can actively modify the at least one of the first amount of power or the second amount of power, for example, by reducing the first amount of power and increasing the second amount of power based on a determination that the electrical load exceeds the second amount of power.

According to a non-limiting embodiment, power to one or more of the motors 110 can be reduced and transferred to a sensor system 162-168 and/or subsystem 140 realizing an increased electrical AC load and vice versa. According to a non-limiting embodiment, HEP system 100 can actively reduce the input power delivered to the propulsion system 205 in response to an increase in at least one of the amounts of power drawn by one or more electrical loads and/or a predicted load demand associated with one or more electrical loads so as to produce an additional amount of available power. Accordingly, the HEP controller can distribute the additional amount of available power among the electrical system based on the load demand of the at least one electrical load.

During aircraft descent, for example, the HEP controller 200 can control the HEP system 100 to reduce AC power delivered to the motors 110 to reduce thrust from the propulsors 205. In some examples, the power reduction can result in the aircraft initiating a controlled descent with or without power, such as a glide or a slow rate of descent. In some examples, the HEP controller 200 can initiate a deceleration of the aircraft when reducing the power to the propulsion system 205, slowing the aircraft slowly while substantially maintaining altitude. The HEP controller 200 can cause the additional power available from reducing the power to the propulsion system 205 to be delivered to one or more electrical systems (e.g. mission systems, a de-ice/anti-ice system, sensor system, etc.) realizing an increase AC load while performing an intended function (e.g., mission execution, radar sensing, de-icing, etc.). Once the mission or other intended function is completed, the AC load can be removed and power can be transferred back to the motors 110 to provide maximum thrust capability from the propulsors 205.

In another example, the HEP controller 200 can reduce the AC load to one or more electrical systems (e.g., one or more of the sensor systems 162-168) in order to deliver increase AC power to the propulsion system 205 (e.g., the motors 110) to produce increased thrust and acceleration needed for the aircraft to perform a spontaneous flight maneuver (e.g., a spontaneous climb). Once the flight maneuver is completed, the power to the propulsion system 205 can be reduced and transferred back to the sensor suite 160.

In one or more non-limiting embodiments, the HEP controller 200 can obtain the information indicating current load amounts and/or requested loads amounts, and can control and manage the HESS 102 accordingly. On one or more non-limiting embodiments, the HESS 102 can provide local status information such as a state of charge or health of the battery system and/or isolated battery pack to the HEP controller 200.

In embodiments, the HEP controller 200 can facilitate control of one or more electric power flows of the hybrid energy storage system 102 to/from the one or more of the electric motor 110, the generator 132, and the aircraft electrical subsystems 140 based on a modeled electric power demand of an engine load of the aircraft engine that may be at a current time step or predicted at one or more future time steps, for example. According to a non-limiting embodiment, the HEP controller 200 is operable to detect and/or predict one or more electrical conditions. For example, the HEP controller 200 can detect and/or predict one or more conditions of the HESS 102 and can configure one or more the electric power flows between the hybrid energy storage system 102 and other elements of the HEP system 100. Detectable and/or predictable conditions can include a current charge level, a remaining storage capacity, health/fault status, and other such information, load demand, and power draw. Further, the conditions may be derived based on environmental factors (e.g., temperature, humidity, etc.), previous usage data or aging effects. For example, if a temperature of the HESS 102 (e.g., the battery system) impacts the storage capacity and/or charge/discharge rate, then such information can be determined in assessing the condition of the HESS 102 (e.g., the battery system).

As one example, the HEP controller 200 can be implemented as a predictive controller or other model-based controller which can prioritize power transfer among the propulsion system 205 and electrical systems included in the aircraft 10. According to a non-limiting embodiment HEP controller 200 can determine a maximum power available to the propulsion system 205 or the electrical systems, and can utilize a prioritization algorithm to determine how to transfer the power throughout the HEP system 100, or shift power between the propulsion system 205 and the remaining electrical systems. In this manner, the HEP controller 200 can balance power loading between the propulsion system 205 and remaining AC electrical systems throughout the duration of the flight.

In one or more non-limiting embodiments, the HEP controller 200 actively controls the input power by actively distributing available power among the electrical loads according to a smart prioritization scheme. For example, based on a determination that a mission system or other electrical load needs to operate, the HEP controller 200 controls the propulsion system 205 to reduce power delivered to the motors 110 thereby reducing thrust/lift output from the fans 113. The reduced power to the motors 110 frees up power, i.e., generates "additional power", which can then be returned or recycled back into the HEP system 100. For example, the motors 110 can be decelerated and the energy stored in its mechanical system can be recovered as additional power. The motor drives 115 can return the additional power to the voltage conversion unit 114, which can convert the additional power into AC power or DC power having an adjusted voltage and/or adjusted current.

According to one or more non-limiting embodiments, the HEP controller 200 can execute the smart prioritization scheme and control the voltage conversion unit 114 to actively distribute the additional power to one or more demanding loads based on one or more actively changing scheme conditions defining the smart prioritization scheme. The changing scheme conditions can be monitored by one or more aircraft sensors and/or controllers and include, but are not limited to: the active mission critical device and/or devices; flight surfaces to maintain aircraft attitude; aircraft management systems such as, for example, flight controls and/or engine controls computers; and remaining power to thrust.

In one or more non-limiting embodiments, the HEP controller 200 can also change the prioritization of power distribution based on one or more changes in aircraft conditions. That is, the HEP controller 200 can prioritize power distribution to different aircraft loads by monitoring aircraft conditions and actively distributing power based on whether the aircraft conditions satisfy a condition threshold, i.e., whether one or more aircraft conditions are greater than a condition threshold or are less than a condition threshold. For example, the HEP controller 200 can prioritize the engine management system of the aircraft 10 along with the propulsion system 205 when the aircraft's altitude falls below an altitude threshold, and in turn actively control the voltage conversion unit 114 to re-distribute power from one or more electrical loads to the propulsion system 205 such that an increased amount of power is re-distributed to the propulsion system 205 to increase thrust/lift output from the fans 113, such as, for example, when the additional thrust/lift may be required for landing. Accordingly, the HEP controller 200 can execute the smart prioritization scheme to balance power throughout the duration of the flight based on actively changing load demands of the aircraft 10.

Figure 3:
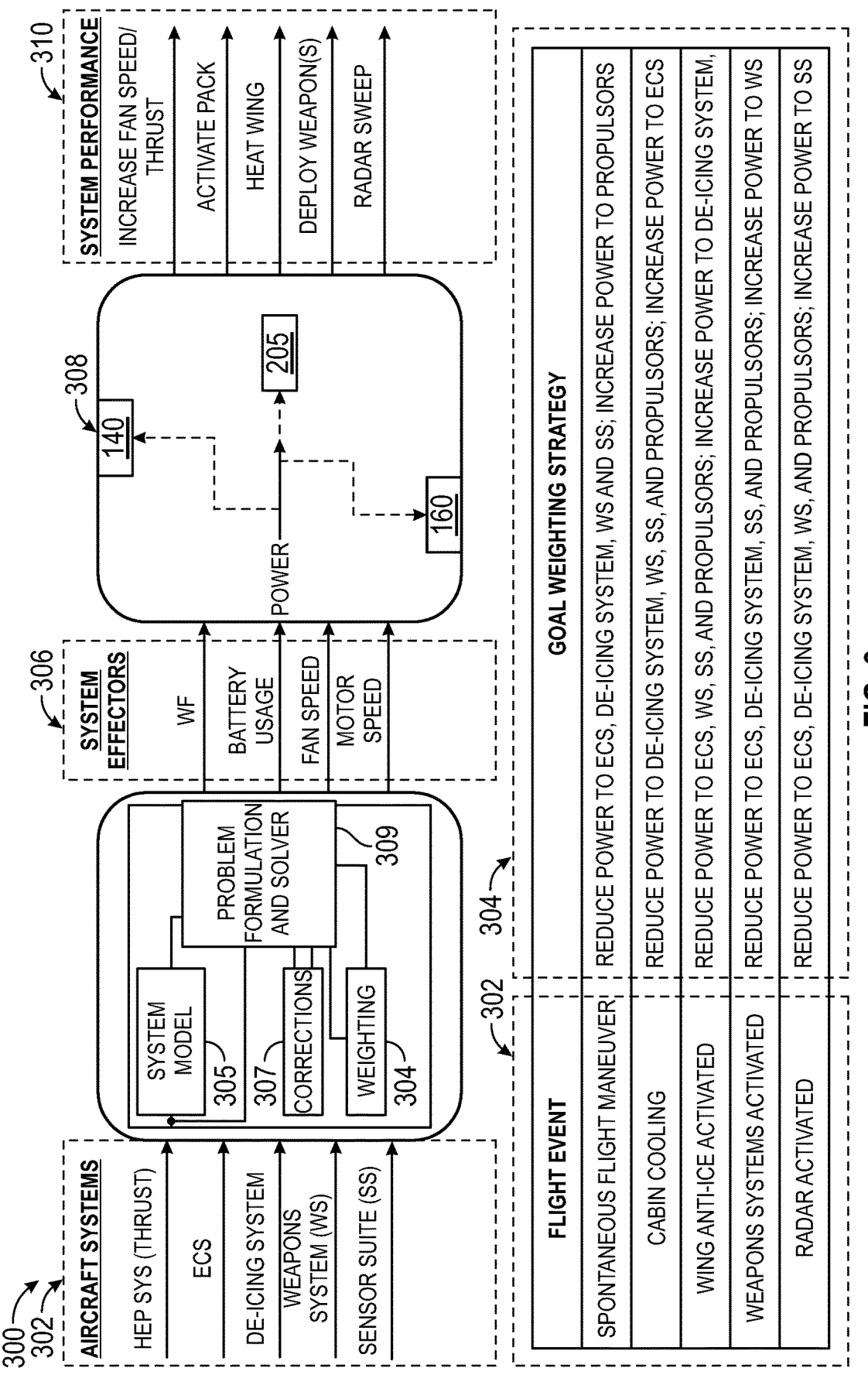
FIG. 3 is a block diagram depicting a power prioritization algorithm implemented in a HEP controller of the aircraft HEP system of FIG. 2, according to a non-limiting embodiment.

FIG. 3 is a block diagram depicting a power prioritization algorithm 300 implemented in the HEP controller 200 according to a non-limiting embodiment. The algorithm takes into account the power demand of the HEP system (e.g., the propulsors, motors, fans, etc.) and various electrical loads including, but not limited to, the environmental control system, the de-icing system, the weapons system (WS) and the sensor suite (SS), and assigns goal weighting strategies 304 that determine how to transfer the power throughout the HEP system 100. The goal weighting strategies 304 can be utilized along with one or more system models 305 of the engine system and/or electrical system, correction values 307 to compensate for inherent errors or calculated differentials appearing in controller computations, and a problem formulation/solver module 309. Accordingly, the HEP controller 200 detects and/or predicts a flight event 302, determines the goal weight strategy 304 mapped to the detected flight event 302, and controls the HEP system 100 to transfer power 308 between the propulsors and the corresponding electrical loads to balance power loading while the corresponding aircraft system responds 310 to perform the flight event.

Figure 4:
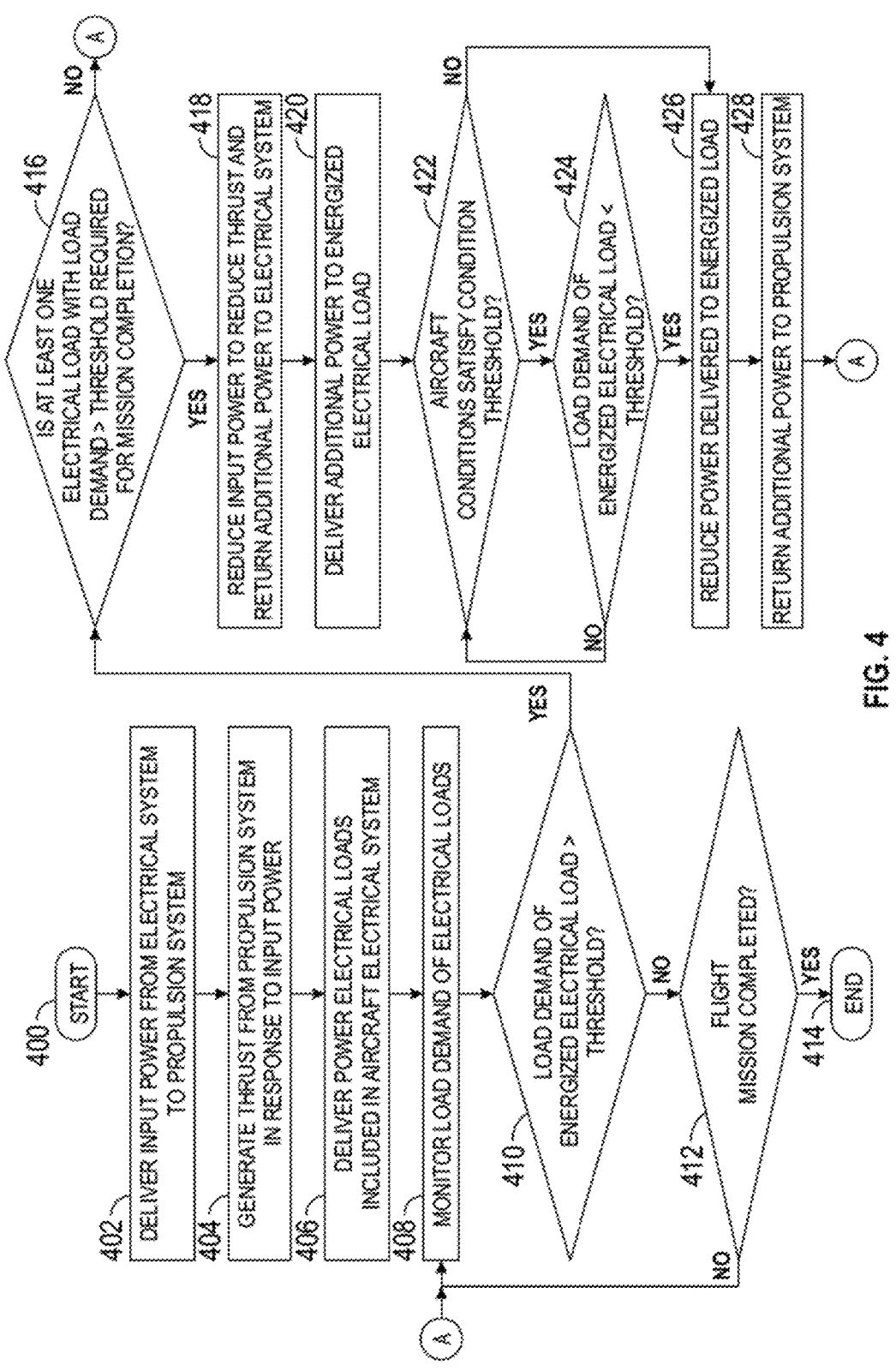
FIG. 4 is a process for actively performing motor and electrical load management in a HEP system of an aircraft according to a non-limiting embodiment.

Turning now to FIG. 4, a method of actively performing motor and electrical load management in a HEP system of an aircraft is illustrated according to a non-limiting embodiment. The method begins at operation 400 and at operation 402 input power is delivered from the aircraft electrical system to the propulsion system. At operation 404, thrust is generated from the propulsion system fans based on the amount of input power delivered to the propulsion system. At operation 406, electrical power generated by the electrical system is delivered to various aircraft electrical loads, and the load demand of the electrical loads is monitored at operation 408.

At operation 410, a determination is made as to whether the load demand of one or more energized loads exceeds a demand threshold. When the load demand does not exceed the threshold, a determination is made at operation 412 as to whether the aircraft has completed the current flight mission. When the flight mission is not completed, the method returns to operation 408 and continues monitoring the load demand of the electrical loads. When, however, the flight mission is completed, the mission ends at operation 414.

Referring again to operation 410, when the load demand of one or more energized loads exceeds the demand threshold, the method proceeds to operation 416 and reduces the input power to the propulsion system, which in turn generates an additional amount of electrical power that is returned to the electrical system. At operation 418, the additional power is delivered by the electrical system to the energized load associated with the load demand that exceeds the demand threshold.

At operation 420, a determination is made as to whether one or more aircraft conditions satisfy a condition threshold. For example, altitude can be compared to an altitude threshold, airspeed can be compared to a speed threshold, thrust output can be compared to a thrust threshold, etc. When the aircraft conditions satisfy the condition threshold (e.g., altitude is equal to or greater than the altitude threshold, airspeed is equal to or greater than the speed threshold, thrust output is equal to or greater than the thrust threshold, etc.), a determination is made as to whether the load demand of the energized load receiving the additional power has fallen below the demand threshold. In one or more non-limiting embodiments, the threshold can be associated with a respective mission critical system. The mission critical systems can include, but are not limited to, flight controls, GPS, and component cooling.

When the load demand has not fallen below the demand threshold, the method returns to operation 420 and continues comparing current aircraft conditions to the condition threshold. When, however, the load demand has fallen below the demand threshold at operation 422, the power delivered to the energized load is reduced at operation 424. At operation 426, additional power obtained from reducing the power delivered to the energized load is returned to the propulsion system and the method returns to operation 408 to continue monitoring the load demand of the electrical loads.

Referring again to operation 420, when the aircraft conditions do not satisfy the condition threshold (e.g., altitude is less than the altitude threshold, airspeed is less than the speed threshold, thrust output is less than the thrust threshold, etc.), the method proceeds to operation 424 and reduces the power delivered to the energized load. At operation 426, additional power obtained from reducing the power delivered to the energized load is returned to the propulsion system and the method returns to operation 408 to continue monitoring the load demand of the electrical loads. The aforementioned operations of the method can continue until the flight mission is completed at operation 412 and the method ends at operation 414.

As described herein, one or more non-limiting embodiments of the present disclosure provide an HEP system can perform load management and energy management associated with different electrical loads on the aircraft, and can operate as an integrated motor/load management system which enables different power exchange modes to actively control thrust of a hybrid propulsor in response to changes in electrical loads applied to the electrical systems. In this manner, the HEP system can provide balanced power loading between the hybrid propulsion system and remaining AC electrical systems throughout the duration of the flight.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A hybrid electrical propulsion (HEP) system included in an aircraft, the HEP system comprising:

a propulsion system configured to generate at least one of thrust or lift for operation of the aircraft, the propulsion system comprising a propulsor and an electric motor configured to drive the propulsor;

an electrical system including a voltage conversion unit configured to deliver a first amount of power to the electric motor and a second amount of power to a plurality of electrical loads that are different from the electric motor; and a HEP controller in signal communication with the electrical system and the propulsion system, the HEP controller configured to store a plurality of different voltage conversion operations corresponding to a plurality of different mission objectives of the aircraft, to monitor a load demand of at least one electrical load of the plurality of electrical loads and to actively modify at least one of the first amount of power or the second amount of power in response to changes in the load demand, wherein the actively modifying the at least one of the first amount of power or the second amount of power includes:

determining an initiated mission system corresponding to a mission objective among the plurality of different mission objectives;

determining the plurality of loads has a load demand that exceeds a load demand threshold associated with the initiated mission system;

reducing the first amount of power delivered to the propulsion system to produce a first excess amount of power;

delivering the first excess amount of power to the voltage conversion unit and performing a voltage conversion operation that corresponds to the initiated mission system of the mission objective to generate a converted first excess amount of power;

outputting the converted first excess amount of power from the voltage conversion unit to increase the second amount of power and satisfy the load demand of the initiated mission system corresponding to the mission objective.

2. The HEP system of claim 1, wherein actively modifying the at least one of the first amount of power or the second amount of power further comprises:

determining the load demand of the initiated mission system is equal to or below the load demand threshold;

reducing the second amount of power to produce a second excess amount of power;

delivering the second excess amount of power to the voltage conversion unit to generate a converted second excess amount of power; and outputting the converted second excess amount of power from the voltage conversion unit to increase the first amount of power delivered to the propulsion system.

3. The HEP system of claim 1, wherein the HEP controller is further configured to determine a predicted load demand of the at least one electrical load, wherein the first amount of power is reduced based on the predicted load demand.

4. The HEP system of claim 1, wherein the HEP controller is further configured to:

identify the at least one electrical load based at least in part on a mission requirement among the plurality of different mission objectives; and determine that the load demand of the at least one electrical load exceeds the second amount of power, wherein actively modifying the at least one of the first amount of power or the second amount of power comprises reducing the first amount of power and increasing the second amount of power based on a determination that the at least one electrical load exceeds the second amount of power.

5. The HEP system of claim 1, wherein the electrical system comprises a sensor in signal communication with the at least one electrical load and the HEP controller, the sensor configured to output a load signal indicative of an amount of power drawn by the at least one electrical load, wherein the HEP controller actively modifies the at least one of the first amount of power and the second amount of power based on the amount of power drawn by the at least one electrical load.

6. The HEP system of claim 5, wherein the HEP controller further predicts the load demand of the initiated mission system and actively modifies the at least one of the first amount of power and the second amount of power based on the amount of power and the predicted load demand.

7. The HEP system of claim 1, wherein actively modifying the at least one of the first amount of power and the second amount of power includes actively distributing a total amount of power available among the plurality of electrical loads according to a smart prioritization scheme configured to actively distribute the total amount of available power to the at least one electrical load based on one or more actively changing scheme conditions.

8. The HEP system of claim 4, wherein the HEP controller is further configured to identify an increase in load demand of the propulsion system and increase the first amount of power in response to the increase in the load demand of the propulsion system.

9. The HEP system of claim 5, wherein the HEP controller actively modifies one or both of the first amount of power and the second amount of power based on a power prioritization algorithm that assigns goal weighting strategies to the HEP system and the at least one electrical load.

10. The HEP system of claim 9, wherein the HEP controller maps power goals to different flight events performed by the HEP system and the at least one electrical load, and controls the electrical system to transfer power between the propulsion system and the at least one electrical load to balance power loading in the electrical system while the propulsion system or the at least one load performs the flight event.

11. A method of actively performing motor and electrical load management in a hybrid electrical propulsion (HEP) system of an aircraft, the method comprising:

generating electrical power from an electrical system;

delivering a first amount of the power to a propulsion system including a propulsor and an electric motor configured to drive the propulsor;

generating, using the propulsion system, at least one of thrust or lift to operate the aircraft based on the first amount of power;

delivering a second amount of the power to a plurality of electrical loads; and storing, in a HEP controller, a plurality of different voltage conversion operations corresponding to a plurality of different mission objectives of the aircraft;

monitoring, by the HEP controller in signal communication with the electrical system and the propulsion system, a load demand of at least one electrical load of the plurality of electrical loads; and actively modifying one or both of the first amount of power and the second amount of power in response to changes in the load demand, wherein the actively modifying the one or both of the first amount of power or the second amount of power includes:

determining an initiated mission system corresponding to a mission objective among the plurality of different mission objectives;

determining the plurality of loads has a load demand that exceeds a load demand threshold associated with the initiated mission system;

reducing the first amount of power delivered to the propulsion system to produce a first excess amount of power;

delivering the first excess amount of power to a voltage conversion unit and performing a voltage conversion operation that corresponds to the initiated mission system of the mission objective to generate a converted first excess amount of power;

outputting the converted first excess amount of power from the voltage conversion unit to increase the second amount of power and satisfy the load demand of the initiated mission system corresponding to the mission objective.

12. The method of claim 11, wherein actively modifying the one or both of the first amount of power or the second amount of power further comprises:

determining the load demand of the initiated mission system is equal to or below the load demand threshold;

reducing the second amount of power to produce a second excess amount of power;

delivering the second excess amount of power to the voltage conversion unit to generate a converted second excess amount of power; and outputting the converted second excess amount of power from the voltage conversion unit to increase the first amount of power delivered to the propulsion system.

13. The method of claim 12, further comprising:

determining, by the HEP controller, a predicted load demand of the at least one electrical load; and reducing the first amount of power based on the predicted load demand.

14. The method of claim 11, further comprising:

identifying, by the HEP controller, the at least one electrical load based at least in part on a mission requirement among the plurality of different mission objectives;

determining, by the HEP controller, that a load demand of the at least one electrical load exceeds the second amount of power; and reducing the first amount of power and increasing the second amount of power based on a determination that the at least one electrical load exceeds the second amount of power.

15. The method of claim 11, further comprising:

outputting, from a sensor in signal communication with the at least one electrical load and the HEP controller, a load signal indicative of the load demand of the at least one electrical load; and actively modifying, by the HEP controller, one or both of the first amount of power and the second amount of power based on the load demand of the at least one electrical load.

16. The method of claim 15, further comprising predicting, by the HEP controller, the load demand of the initiated mission system; and actively modifying, by the HEP controller, the one or both of the first amount of power and the second amount of power based on the amount of power and the predicted load demand.

17. The method of claim 12, wherein actively modifying the one or both of the first amount of power and the second amount of power comprises: actively distributing a total amount of power available among the plurality of electrical loads according to a smart prioritization scheme configured; and actively distributing the total amount of available power to the at least one electrical load based on one or more actively changing scheme conditions.

18. The method of claim 14, further comprising:

identifying, by the HEP controller, an increase in a load demand of the propulsion system; and increasing the first amount of power in response to the increase in the load demand of the propulsion system.

19. The method of claim 15, further comprising:

executing, the by HEP controller, a power prioritization algorithm that assigns goal weighting strategies to the HEP system and the at least one electrical load;

actively modifying, by the HEP controller, one or both of the first amount of power and the second amount of power based on power prioritization algorithm.

20. The method of claim 19, further comprising:

mapping, by the HEP controller, power goals to different flight events performed by the HEP system and the at least one electrical load; and controlling the electrical system to transfer power between the propulsion system and the at least one electrical load to balance power loading in the electrical system while one or both of the propulsion system and the at least one load performs a flight event included in the different flight events.

* * * * *